(12) United States Patent
Miwa et al.

(10) Patent No.: US 7,549,271 B2
(45) Date of Patent: Jun. 23, 2009

(54) METHOD FOR MANUFACTURING AIRBAG MODULE

(75) Inventors: Kazuya Miwa, Tokyo (JP); Akira Kokeguchi, Tokyo (JP); Wataru Nakazawa, Tokyo (JP)

(73) Assignee: Takata Corporation, Tokyo (JP)

( * ) Notice: Subject to any disclaimer, the term of this patent is extended or adjusted under 35 U.S.C. 154(b) by 208 days.

(21) Appl. No.: 11/637,079

(22) Filed: Dec. 12, 2006

(65) Prior Publication Data

US 2007/0145724 A1 Jun. 28, 2007

(30) Foreign Application Priority Data

Dec. 28, 2005 (JP) .............................. 2005-379263

(51) Int. Cl.
*B65B 1/24* (2006.01)
(52) U.S. Cl. .............................. 53/436; 53/439; 53/484; 53/510
(58) Field of Classification Search .................. 53/436, 53/439, 477, 484, 79, 510; 280/728.2, 728.3, 280/743.2, 728.1; 493/449, 457, 458
See application file for complete search history.

(56) References Cited

U.S. PATENT DOCUMENTS

| 5,004,266 | A | * | 4/1991 | Miller et al. ............. 280/743.2 |
| 5,324,070 | A | * | 6/1994 | Kitagawa et al. ......... 280/730.1 |
| 5,326,131 | A | * | 7/1994 | Yokota et al. ............ 280/728.2 |
| 5,527,062 | A |   | 6/1996 | Kreuzer |
| 5,562,301 | A |   | 10/1996 | Lutz |
| 5,765,867 | A | * | 6/1998 | French ..................... 280/743.2 |
| 5,846,620 | A | * | 12/1998 | Compton ................... 428/35.7 |
| 6,070,904 | A |   | 6/2000 | Ozaki et al. |
| 6,371,510 | B1 |   | 4/2002 | Marriott et al. |
| 6,585,292 | B2 | * | 7/2003 | Abe et al. ................ 280/743.1 |
| 6,626,457 | B2 | * | 9/2003 | Masuda et al. ........... 280/728.2 |
| 7,322,596 | B2 | * | 1/2008 | Nakazawa ............... 280/728.2 |
| 2002/0089155 | A1 |   | 7/2002 | Tajima et al. |
| 2006/0012157 | A1 | * | 1/2006 | Ishiguro et al. ............. 280/731 |
| 2007/0138768 | A1 | * | 6/2007 | Miwa et al. .............. 280/728.2 |
| 2007/0138769 | A1 | * | 6/2007 | Miwa et al. .............. 280/728.2 |
| 2007/0241541 | A1 | * | 10/2007 | Miwa et al. .............. 280/728.2 |

FOREIGN PATENT DOCUMENTS

| JP | H04-146840 | 5/1992 |
| JP | H08-145733 | 6/1996 |
| JP | H08-156733 | 6/1996 |
| JP | H11-28997 | 2/1999 |

* cited by examiner

*Primary Examiner*—Sameh H. Tawfik
(74) *Attorney, Agent, or Firm*—Manabu Kanesaka

(57) ABSTRACT

An airbag module for use in a motor vehicle is manufactured by first to third steps. In the first step, the airbag is folded into a predetermined configuration, and in the second step, an entire external surface of the airbag, in an initially folded condition obtained in the first step, is wrapped in a bag-shaped film forming member. The bag-shaped film forming member includes a plurality of resin layers formed in a layer-stack manner with regard to a film cross-sectional direction. In the third step, the initially folded airbag is housed in the airbag-housing member in a condition wherein the airbag has an airbag volume reduced to less than the airbag volume at a time of being initially folded, by a compression force applied to the bag-shaped film forming member.

17 Claims, 10 Drawing Sheets

METHOD FOR MANUFACTURING AIRBAG MODULE

BACKGROUND OF THE INVENTION AND RELATED ART STATEMENT

The present invention relates to a method for manufacturing an airbag module for a motor vehicle.

Hitherto, for example, in the Unexamined Patent Application Publication No. 8-156733, an airbag apparatus having a construction in which an airbag, to which gas for developing and expanding the airbag is supplied from an inflator, is developed and expanded in an occupant restraining area at a time of a motor vehicle accident, is known. In designing this kind of airbag apparatus, specifically, the need for miniaturization of the apparatus is high. In order to respond to this need, it is common to use a method in which a specification of a base cloth of the airbag constituting the airbag, folding-back structure of the airbag, a structure of the inflator, a structure of other components, and the like are considered. However, with this method, careful inspection of the basic structure of the airbag apparatus during manufacture is necessary, and this induces problems of high costs and prolonged production times.

Consequently, the present invention has been developed in light of the above-described issue, and is directed to providing a technology effective for miniaturizing an airbag module, and a method through which an airbag for use in a motor vehicle can be easily folded in a predetermined configuration and housed in an airbag-housing member.

Further objects and advantages of the invention will be apparent from the following description of the invention.

SUMMARY OF THE INVENTION

The present invention is directed to overcome the aforementioned problems. Further, the present invention is applicable to the manufacture of an airbag module mounted on various types of motor vehicles, such as, automobile motor vehicles, trucks, buses, electric trains, boats and ships, motor cycles, and the like.

A first aspect of the present invention for obviating the aforementioned problems resides in a method of manufacturing an airbag module comprising at least a first step, a second step, and a third step. Further, the airbag module in the present invention is provided with at least a construction that enables it to be used in a motor vehicle, via being folded into a predetermined configuration and housed in an airbag-housing member. The airbag module can alternatively be referred to as an airbag apparatus.

The first of the above-mentioned steps or processes, comprises folding the airbag into a predetermined configuration. This airbag is adapted for restraining a body both inside and outside of a motor vehicle, while being deployed in a predetermined developing and expanding area at a time of a motor vehicle accident. The body which is restrained by the airbag, can include but is not limited to an occupant seated in a driver's seat, an occupant seated in a front passenger seat, an occupant seated in a seat other the driver's seat or the front passenger seat such as a rear seat, a pedestrian outside the motor vehicle, or the like. Accordingly, the deployment zone where the airbag according to the present invention is developed and expanded, is not limited to in-car usage for a vehicle occupant or occupants, but also includes an external zone outside the motor vehicle for a pedestrian or pedestrians.

Further, the airbag-housing member is constructed to house the airbag in a folded condition. As the "predetermined configuration" described herein, a roll-folding configuration formed in a manner such that the airbag is retracted into a roll shape; a bellows folding configuration formed in a manner such that the airbag is folded into a bellows shape; a configuration forming the folds having no specific shape and direction in which a fold-gathering operation toward a center of an airbag are performed on an empty airbag being spread, within a limit of forming cross-section of a determined height and a direction (sometimes referred to as machine-folding); a folding configuration in which these configurations are complex with respect to each other, and the like, are included.

The second step involves wrapping an entire external surface of the airbag in the initially folded condition obtained using the first step, by means of a bag-shaped film member which is formed from a plurality of resin layers configured in a layer-stack manner with regard to a film cross-sectional direction.

The third step is performed after the second step, and is involves housing the initially folded airbag in the airbag-housing member in a condition in which an airbag volume is reduced to one less than that at a time of being initially folded, using a compressing force applied to the airbag via the bag-shaped film member.

In accordance with the various aspects of the present invention, the method of applying the compressing force to the airbag in the folded condition via the film member, non-exclusively includes, a method for compressing the folded airbag by evacuating the space within film member to produce a reduced (with respect to atmospheric pressure) pressure condition, a method for compressing the airbag in the folded condition via the film forming member by performing a heat-contraction process (e.g. shrink wrap) for the film forming member including a heat-contractive resin film, and the like can be used.

Further, with regard to the bag-shaped film member that encloses the entire external surface of the folded airbag, it is within the scope of the present invention to appropriately use a method in which each of outer edge portions of each of film pieces are joined to form the bag shape by heat-welding, bonding, or the like, upon sandwiching the airbag in the folded condition between a plurality of resin film pieces; or a method in which an airbag, in a folded condition is put into an open bag-shaped, or a tube-shaped (cylindrical) resin film member that is previously prepared, through an opening thereof, and thereafter the opening portion is bound up and tightly sealed by means of a clamp, resulting in a bag shape, or the like.

Furthermore, in accordance with the various aspects of the present invention, the bag-shaped film forming member may serve as the airbag-housing member, or the airbag-housing member can be prepared separately from the bag-shaped film forming member. In the case that the airbag-housing member is prepared separately from the bag-shaped film forming member, the film forming member may be housed in the airbag-housing member together with the airbag in the folded condition, or after the film forming member is housed in the airbag-housing member together with the airbag in the folded condition, only the film forming member may be removed from the airbag-housing member.

As described above, in accordance with the method for manufacturing the airbag module according to the first aspect, it becomes possible to miniaturize the airbag module by means of an easy method compressing the initially folded condition airbag via the film forming member without examining a specification of a base cloth of an airbag, folding-back structure of the airbag, a structure of an inflator, and the like.

A second aspect of the invention of solving the aforementioned problems resides in a method for manufacturing the airbag module in a manner wherein the bag-shaped film forming member according to the first aspect has a construction including a heat-contractive resin layer in a plurality of resin layers. That is, all or a part of a plurality of resin layers of the film forming member comprises a heat-contractive resin layer. In addition, in the third step of the first aspect, the airbag in the initially folded condition is compressed via the film forming member by performing heat-contraction (heat shrink) processing for the bag-shaped film forming member, i.e., typically, by performing heat-processing, and the airbag volume is thereby reduced to less than that when it was initially folded.

According to the second aspect of the invention, it becomes possible to miniaturize the airbag module by means of an easy method performing the heat-contraction or heat shrinking the film forming member by using a film forming member including a heat-contractive resin layer.

A third aspect of the present invention for solving the aforementioned problems, resides in a method wherein the bag-shaped film forming member is constructed using a film sheet including a heat-welding resin layer. Further, in the second step according to the first aspect, two pieces of the film sheets are oriented toward each other in a manner wherein the heat-welding resin layers arranged on the inside, the initially folded airbag is sandwiched between these film sheets, and each of the outer edge portions of the film sheets is joined and formed into a bag shape in a tightly sealed condition by heat-welding the heat-welding resin layers together. Furthermore, in the third step according to the first aspect, the airbag in the initially folded condition is compressed via the film forming member by performing an evacuation (viz., pressure reducing) process on the bag-shaped film forming member in a tightly sealed evacuated condition.

With this, the airbag volume is reduced to less than that at a time when it was initially folded. Incidentally, with regard to the re-pressurization process, this method non-exclusively includes a method in which an internal part of the bag-shaped film forming member is re-pressurized by releasing the evacuation and returning the pressure to atmospheric pressure, after wrapping the airbag in the folded condition by the bag-shaped film forming member in an evacuated container; or a method in which an internal part of the film forming member is evacuated by vacuuming out the air inside the film forming member, after wrapping the airbag in the folded condition by the bag-shaped film forming member, and the like can be used. Further, with regard to the negative pressure used in the evacuation process, a negative pressure anywhere between atmosphere pressure and full vacuum can appropriately be adopted.

In accordance with the method for manufacturing the airbag module according to the third aspect as described above, it becomes possible to miniaturize the airbag module by means of an easy method by the evacuation processing of the film forming member. Specifically, by setting the negative pressure in the evacuation processing to a value of the pressure in the vicinity of a vacuum, the airbag module is can be further miniaturized.

A fourth aspect of the present invention for solving the aforementioned problems is such that the bag-shaped film forming member for compressing the initially folded airbag is used as an airbag housing member in the manufacturing method according to either one of the second or third aspects.

In accordance with the manufacturing method of the airbag module according to the forth aspect as described above, a function of compressing the initially folded airbag and a function wherein the airbag-housing member for housing the airbag in the folded condition can be applied to the bag-shaped film forming member and it is therefore possible.

A fifth aspect of present invention resides in a method for manufacturing the airbag module wherein the bag-shaped film forming member for compressing the initially folded airbag is used as an airbag holding member for holding a folded shape of the airbag in the manufacturing method according to either one of the second or third aspect.

In accordance with the manufacturing method of the airbag module according to the fifth aspect as described above, it is possible that the compression of the airbag can be carried out under the conditions that it is disposed directly in an airbag-holding member and that the airbag holding member be used in place of the bag-shaped film forming member.

The sixth aspect of the present invention resides in the use of any of a plurality of resin layers of the film forming member is constructed as a translucent resin layer in the manufacturing method according to the third aspect. In addition, in the present invention, a fourth step successively performed after the third step is provided. The fourth step is defined as a step for confirming the condition of the airbag obtained by the third step, through the bag-shaped film forming member. With regard to the translucent resin layer mentioned here, it is sufficient that the visible confirmation is possible through the resin layer regardless of the small or large of a degree of the translucency. As a translucent resin layer, a translucent film sheet, a half transparent film sheet (translucent white film sheet or colored film sheet) can appropriately be used.

In accordance with the method for manufacturing the airbag module according to the sixth aspect as described above, it can be confirmed whether the airbag in the film forming member is held in a desired shape or whether the airbag in the film forming member is not appropriately sandwiched in between the heat-welded portion of the film sheet, or the like, via visible/optical observation through the translucent resin layer. Therefore, inspection of the airbag configuration can be readily carried out thus facilitating quality control.

The seventh aspect of the present invention for solving the aforementioned problems resides in a method wherein, fifth and sixth steps are performed successive to the fourth step further, in the manufacturing method according to the third aspect. The fifth step is a step performed successive to the fourth step, and is defined as a step for housing the film forming member in the airbag housing member having a housing space larger than the film forming member and smaller than the initially folded airbag.

Further, the sixth step is a step performed successive to the fifth step, and is defined as a step for expanding the airbag along the housing space of the airbag-housing member by weakening the compression force applied to the airbag by weakening the evacuation processing performed in the third step. The airbag is expanded by developing force of the airbag itself because of weakening of the compressing force applied from the film forming member, and thereby the airbag volume to be occupied by the airbag is increased. In the sixth step, the compression processing may be weakened by reducing the degree of evacuation, or the evacuation processing may be weakened by bleeding off some of the evacuation.

In accordance with the method for manufacturing the airbag module according to the seventh aspect as described above, the airbag in the folded condition can be expanded along the housing space of the airbag-housing member by weakening the compression force applied to the airbag in the folded condition, after once reducing the airbag volume by housing the airbag in the folded condition in the film forming member. The expanding operation of the airbag at this moment is limited by the housing space of the airbag-housing member, and thereby there is no possibility that a size of the airbag after expansion exceeds a size of the housing space. That is, the size of the airbag after expanded is to be maintained in a condition smaller than that at the time when the airbag is initially folded without exception.

The eighth aspect of the present invention for solving the aforementioned problems resides in a method wherein the film forming member according to the seventh aspect is provided with a communication portion that allows in and out of the film forming member to communicate with each other, and a covering member that is capable of forming a covering condition for covering the communication portion and a releasing condition for releasing a covering operation. Further, in the third step, the communication portion is set to a condition to be covered by the covering member at a time when the decompression processing is performed for the film forming member. On the other hand, in the sixth step, when the evacuation processing is weakened, the covering condition for the communication portion covered by the covering member is set with respect to a releasing condition.

In accordance with the method for manufacturing the airbag module according to the eighth aspect as described above, in the third step, it becomes possible to maintain the evacuated condition of the film forming member while blocking a flow of air communicating the communication portion by setting the communication portion into a condition covered by the covering member. On the other hand, in the sixth step, it becomes possible to weaken the evacuated condition of the film forming member by introducing the air into the film forming member through the communication portion by setting the condition in which the covering condition of the communication portion formed by the covering member is released. As described above, according to the present invention, the setting for maintaining the evacuated/reduced pressure condition of the film forming member and the setting for weakening the negative/reduced pressure condition become to be possible to be readily performed using the communication portion and the covering member.

As described above, according to the present invention, at a time when an airbag module, in which an airbag for use in a motor vehicle, being folded in a predetermined configuration is housed in an airbag housing member, is manufactured, an entire external surface of the initially folded airbag is wrapped by a bag-shaped film forming member in which a plurality of resin layers is particularly formed in a layer-stack manner with regard to a film cross-sectional direction. In addition, a method for housing the airbag in an airbag housing member, in a condition in which an airbag volume is reduced less than that at a time when being initially folded, by means of a compression force applied via the film forming member is used. As a result, it becomes possible to miniaturize the airbag module by means of an easy method.

DETAILED DESCRIPTION OF PREFERRED EMBODIMENTS

Figure 1:
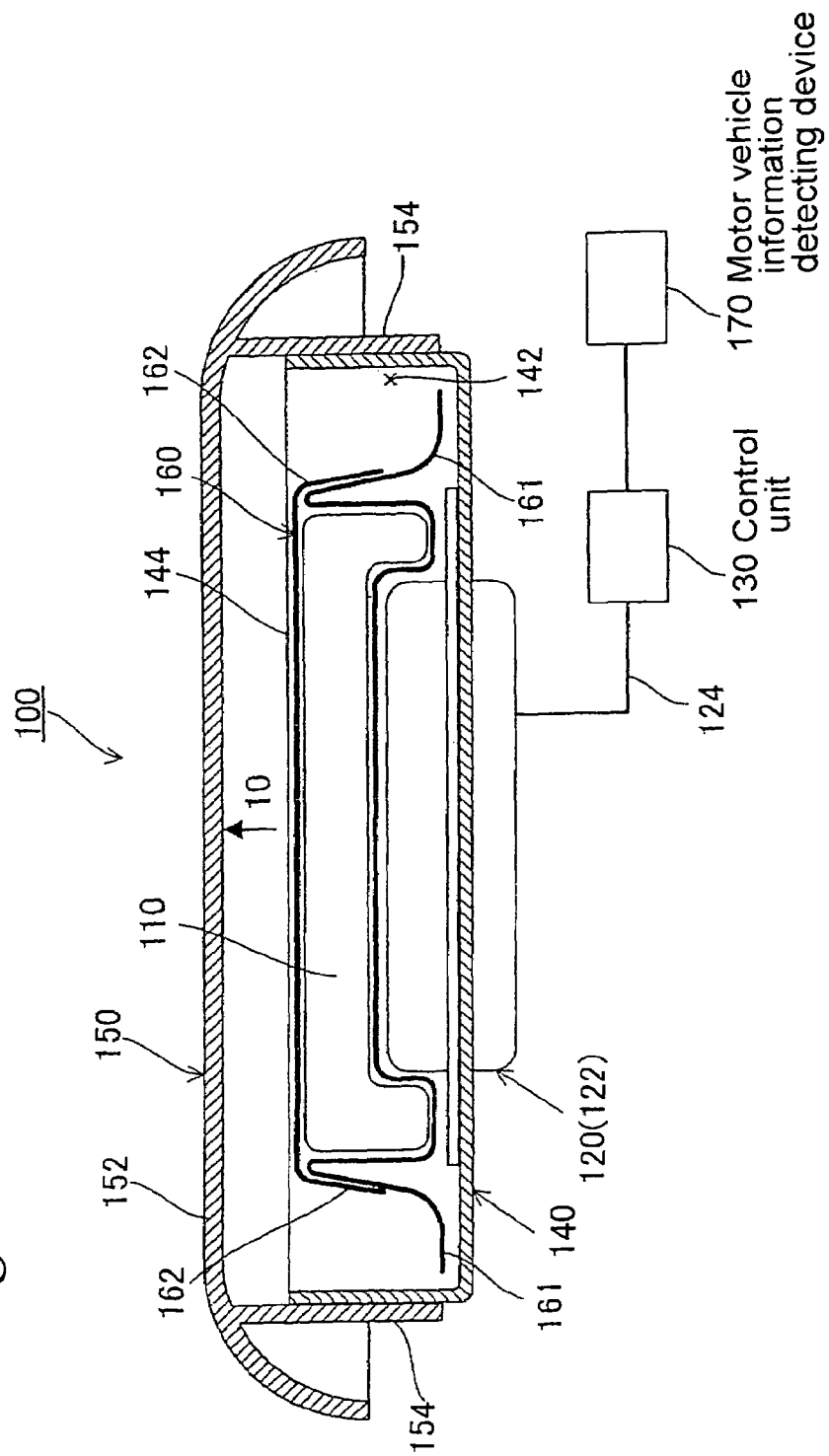
FIG. 1 is a view showing a cross-sectional structure of an airbag apparatus of the present invention.

Hereinafter, embodiments of the present invention will be explained in detail referring to the drawings. Firstly, a construction of an airbag apparatus 100 of the present embodiment will be explained referring to FIGS. 1 through 4. The airbag apparatus 100 is, though not specifically shown, an airbag apparatus mounted corresponding to an occupant seated in a driver's seat of an automobile motor vehicle (hereinafter referred to as motor vehicle occupant), and is constructed to be built in a steering wheel for steering a motor vehicle.

A cross-sectional structure of the airbag apparatus 100 with respect to the present invention is shown in FIG. 1. The airbag apparatus 100 is at least provided with an airbag 110, an inflator 120, a control unit 130, a retainer 140, an airbag cover 150, and an airbag-holding member 160, as basic components thereof.

The airbag 110 is a bag-shaped bag developing and expanding so as to restrain the motor vehicle occupant at an occurrence of a motor vehicle accident. The airbag 110 is formed by stitching one piece or a plurality of pieces of airbag base cloth formed from a synthetic resin into a bag shape. Further, the airbag 110 is housed in the retainer 140 in a folded condition being folded in a predetermined configuration. As the "predetermined configuration" described here, a roll-folding configuration formed in a manner such that the airbag 110 is retracted into a roll shape, a bellows folding configuration formed in a manner such that the airbag 110 is into a bellows shape, a folding configuration in which these configurations are in complex with each other, and the like, are typical. The airbag 110 corresponds to the "airbag for use in a motor vehicle" in the present invention.

The inflator 120 includes a gas-generating portion 122 generating the gas for developing and expanding the airbag 110, in a built-in manner in an internal space of the airbag 110 constructed to have a bag-shape. The gas-generating portion 122 is connected to the control unit 130 via a harness 124, and generates the gas for developing and expanding the airbag 110 by being activated by means of an output of a control signal from the control unit 130. This gas for developing and expanding the airbag 110 generated in the gas-generating portion 122 is to be supplied to an internal part of the airbag 110 through a gas-distributing pathway (not shown). The control unit 130 is composed of a CPU (Central Processing Unit) having a known construction, a ROM, a RAM, an input and output device, a peripheral device (illustration of any of these devices is omitted), and the like. Further, the control unit 130 is connected to a motor vehicle information detecting device 170 serving as a component on a motor vehicle side, and outputs a control signal to the gas-generating portion 122 on the basis of information transmitted from the motor vehicle information detecting device 170. Typically, a collision detecting sensor that detects occurrence of the motor vehicle collision on the basis of acceleration or the like applied to the motor vehicle is used as the motor vehicle information detecting device 170.

The retainer 140 is constructed as a box-shaped case member having a bottom provided with a function for housing the airbag 110 having the aforementioned construction, and the inflator 120. In concrete terms, in a housing space 142 of the retainer 140, the inflator 120 is housed at a lower part thereof, and the airbag 110 is housed above the housed inflator 120. At an upper part of the retainer 140, an airbag opening 144 that opens so as to allow developing and expanding operations of the airbag 110 in the housed condition is formed. The airbag 110 deploys in a direction indicated by an arrow 10 in FIG. 1, while being developed and expanded through the airbag opening 144 at a time of occurrence of the motor vehicle collision. The retainer 140 is constructed with using a molded member formed from a metal material or a resin material. The retainer 140 described here corresponds to the "airbag housing member" in the present invention.

The airbag cover 150 is constructed as a resin-material made member that covers the airbag opening 144 of the retainer 140 from above in a housed condition that the airbag 110 is housed in the retainer 140. By means of the above-described, the motor vehicle occupant side of the airbag 110 is covered by the airbag cover 150. The airbag cover 150 is, in concrete terms, provided with a flat plate portion 152 horizontally extending along an opening plane surface of the airbag opening 144, and a standing portion 154 standing along a wall portion of the retainer 140 from the flat plate portion 152. The airbag cover 150 is attached to and fixed to a retainer 140 side at the standing portion 154. In addition, although not shown, a reduced-thickness portion in which a plate thickness at the flat plate portion 152 or the standing portion 154 is relatively reduced, namely a so-called tear line is provided in the airbag cover 150. The airbag cover 150 ruptures at the tear line thereof and forms the airbag opening 144 to have an open condition by weighting at a time of developing and expanding operations of the airbag 110 when a motor vehicle accident such as a motor vehicle collision is caused. Further, the airbag cover 150 allows the airbag 110 to protrude outside the retainer 140 through the airbag opening 144.

Figure 2:
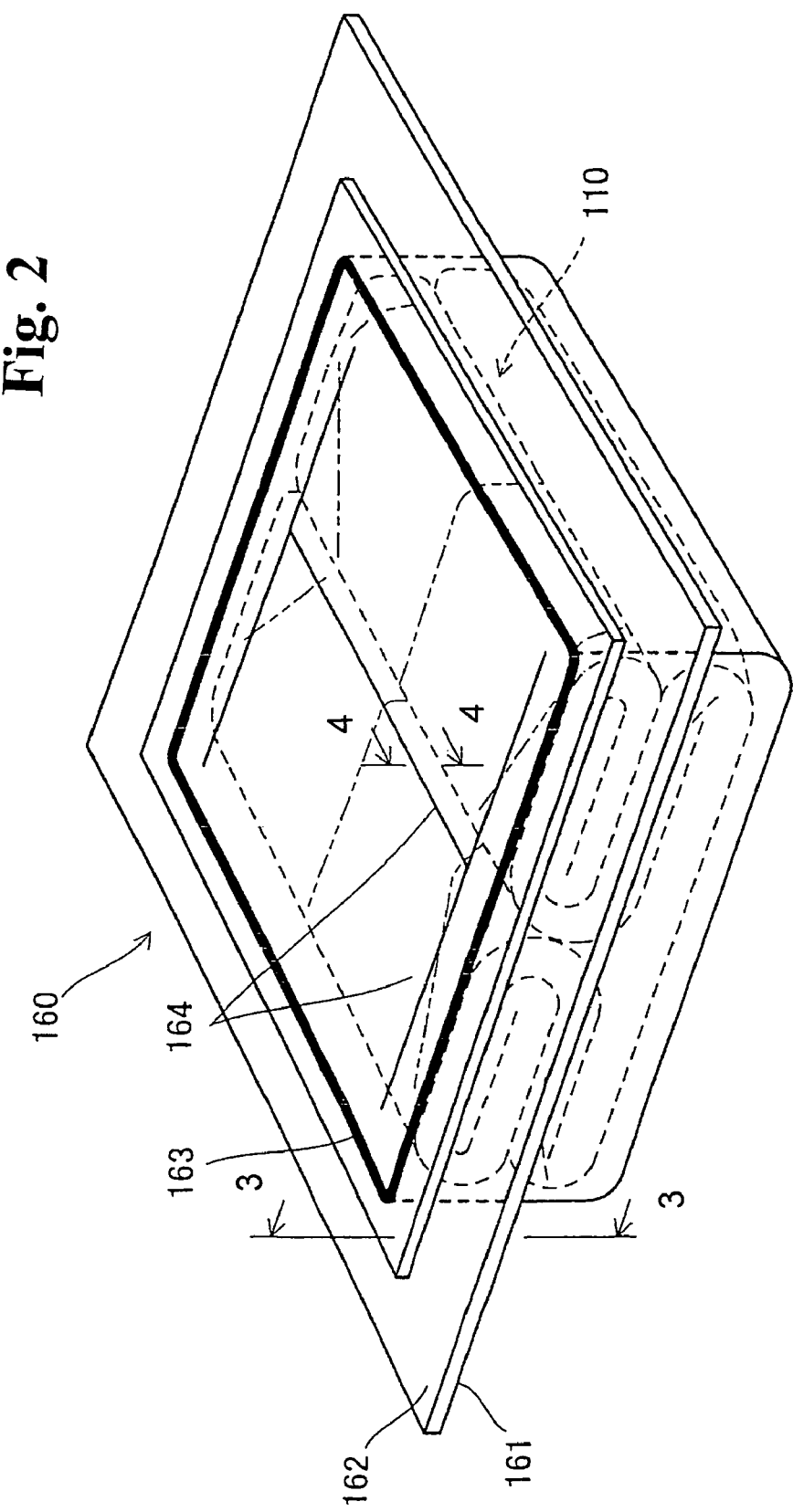
FIG. 2 is a view showing a condition in which an airbag in a folded condition in the present embodiment is held by an airbag-holding member.

The airbag-holding member 160 is a member provided with a function to hold (sometimes called as "to maintain") a folded shape of the airbag 110 by providing a film having translucency in an adhering manner at an external surface of the airbag 110 in a folded condition being folded in a predetermined configuration. The airbag-holding member 160 is constructed by joining a lower film sheet 161 and an upper film sheet 162 each other into a bag shape, and thereafter sandwiching the airbag 110 in the folded condition between the lower film sheet 161 and the upper film sheet 162. At this moment, a condition in which the folded shape of the airbag 110 in the folded condition of the present embodiment is held by the airbag-holding member 160 is shown in FIG. 2. Further, a cross-sectional structure with regard to a line 3-3 of the airbag-holding member 160 in FIG. 2 is shown in FIG. 3, and a cross-sectional structure with regard to a line 4-4 of the airbag-holding member 160 in FIG. 2 is shown in FIG. 4.

As shown in FIG. 2, any of the two pieces of the lower film sheet 161 and the upper film sheet 162 constituting the airbag-holding member 160 in the present embodiment is formed from a sheet-shaped film having the translucency. The airbag-holding member 160 is formed into a bag shape while overlapping an outer peripheral edge portion of the lower film sheet 161 and an outer peripheral edge portion of the upper film sheet 162 on each other, and heat-welding (joining) each other at a heat-welding portion 163. In the present embodiment, the airbag 110 in the folded condition is sandwiched by the lower film sheet 161 and the upper film sheet 162 and thereafter each of the outer edge portions of each of the film sheets are heat-welded and sealed. Thereby, the airbag-holding member 160 is configured into an airbag-packaging condition (sometimes called as "sealing condition", "tight-sealing condition", or "packing condition") in which an entire external surface of the airbag 110 in the folded condition is wrapped up with the lower film sheet 161 and the upper film sheet 162. In the airbag-packaging condition of the airbag-holding member 160, the folded shape of the airbag 110 in the folded condition is configured to be assuredly held by the airbag-holding member 160.

Figure 3:
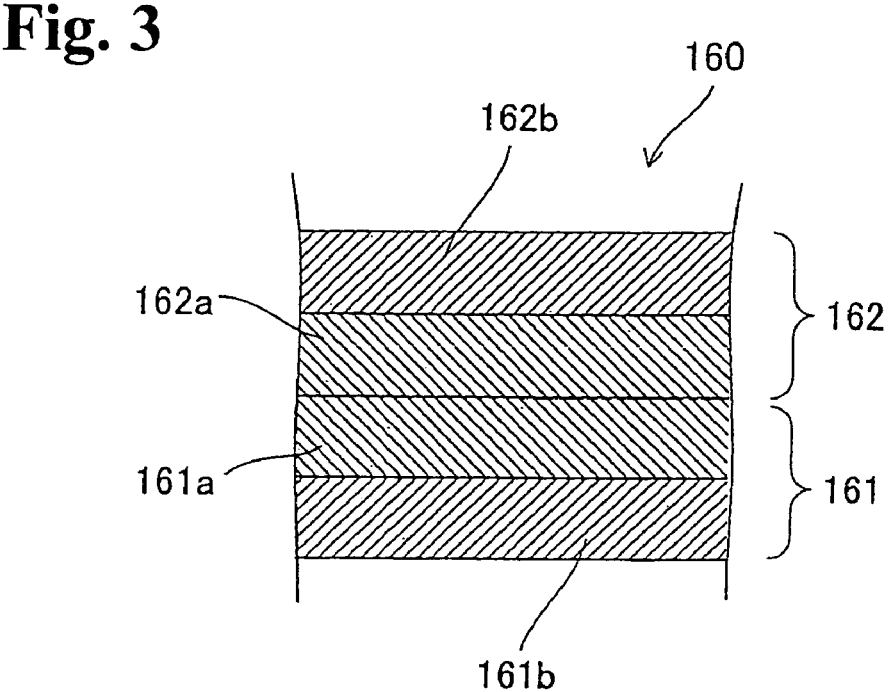
FIG. 3 is a view showing a cross-sectional structure taken along line 3-3 in the airbag-holding member in FIG. 2.
Figure 4:
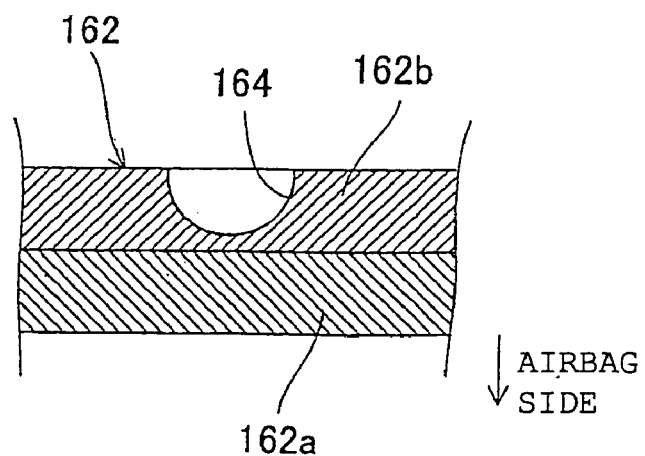
FIG. 4 is a view showing a cross-sectional structure taken along line 4-4 in the airbag-holding member in FIG. 2.

As shown in FIG. 3, in the airbag-holding member 160 in the present embodiment, any of the lower film sheet 161 and the upper film sheet 162 is configured to be a film having a two-layer structure in which the first resin layer and the second resin layer are disposed in a layer-stack manner with regard to a film cross-sectional direction. Further, in the airbag-holding member 160, the lower film sheet 161 and the upper film sheet 162 are disposed in a manner such that the first resin layer 161a at a side of the lower film sheet 161 and the first resin layer 162a at a side of the upper film sheet 162 face each other.

The first resin layers, 161a and 162a, are constructed as resin layers at the side of the airbag where the airbag 110 is directly in contact therewith, and are constructed as resin layers having the translucency in the formed condition, and heat-welding resin layers. On the other hand, second resin layers, 161b and 162b, are resin layers provided outside the first resin layers, 161a and 162a, which are not directly in contact with the airbag 110, and are constructed as resin layers having the translucency in the formed condition and high strength. Incidentally, the film as the airbag-holding member 160 in the present embodiment may be a single film having an integrally formed shape including a portion of a first resin layer 161a, 162a and a portion of a second resin layer 161b, 162b, or may be a film having a construction in which a film formed from the first resin layer 161a, 162a and a film formed from the second resin layer 161b, 162b are overlapped on each other in the layer-stack manner.

Further, the present embodiment is constructed such that a portion where the thin thickness portion (some times also called as "weak portion" or "reduced-thickness portion") with regard to a film cross-sectional direction is formed in a continuous line like manner or a continual line like manner, namely a so-called tear line 164, is provided at an upper surface of the upper film sheet 162 positioned above the airbag 110 in a condition being housed in the retainer 140, as shown in FIG. 2. In this case, a depth of the reduced thickness with regard to a film cross-sectional direction of the tear line 164 can appropriately be set within a limit of a wall thickness of the second resin layer 162b. It is preferable that, for example, the depth of the reduced thickness with regard to the film cross-sectional direction of the tear line 164 is set such that the strength at the tear line 164, namely the force required for rupturing at the tear line 164 is set to be smaller than the airbag holding force (substantially, the welding strength of the heat-welding portion 163) of the airbag-holding member 160 for holding the airbag 110 in the folded condition.

According to the airbag apparatus 100 having the above-described construction, the folded shape of the airbag 110 in the folded condition is prevented from being deformed, and it becomes possible for the folded shape to assuredly be retained by using the airbag-holding member 160 formed from the film configured to have a bag shape for wrapping around the entire external surface of the airbag 110 in the folded condition. By constructing as described above, it becomes possible for the quality with regard to retention of the folded shape of the airbag 110 to be easily determined. Further, since the present embodiment has a construction in which the entire external surface of the airbag 110 is wrapped with the film, there is no possibility that the folded configuration of the airbag 110 is affected or influenced by the structure of the airbag-holding member 160. Furthermore, by sealing the airbag 110 in the folded condition with the bag-shaped film, deterioration of the airbag 110 can be suppressed.

Furthermore, according to the present embodiment, since the tear line 164 that serves as the thin thickness portion is provided at a previously determined position of the airbag-holding member 160, and the airbag-holding member 160 is constructed to be ruptured at the tear line 164, it becomes possible to suppress the airbag-holding member 160 to affect bad influence to the developing capability of the airbag 110 by being ruptured at an unspecified portion, and thereby it becomes possible to be aimed at achieving the appropriate developing capability of the airbag 110.

Moreover, in the present embodiment, since the airbag-holding member 160 is formed from the translucent film, the airbag-holding member 160 is provided with a function in which the folded condition of the airbag 110 can be visibly confirmed at a time when, and after the time when the airbag-holding member 160 is mounted, in addition to the original function for holding the folded shape of the airbag 110 in the folded condition. As for the translucency of the film, it is sufficient that the translucent film enables visible confirmation through the film regardless of the small or large of a degree of the translucency. As the film, a transparent film and a half transparent film (translucent white film or colored film) can appropriately be used. According to such a construction of the airbag apparatus 100 described above, since it is possible to visibly confirm whether the folded shape of the airbag 110 in the folded condition is held (maintained) without being deformed, through the airbag-holding member 160 as needed, it becomes possible for the quality with regard to the holding condition for the folded shape of the airbag 110 to be ascertained.

In the airbag apparatus 100 having the aforementioned construction, when the airbag 110 is developed and expanded at the time of occurrence of the motor vehicle accident, the developing and expanding force is exerted to an internal peripheral surface of the airbag-holding member 160. In this case, the strength of the tear line 164 of the airbag-holding member 160 is configured to be smaller than the holding force of the film for holding the airbag 110 in the folded condition, and thereby the airbag-holding member 160 is ruptured at the tear line 164 and releases the holding condition for the folded shape of the airbag 110. In addition, the airbag-holding member 160 allows a developing and expanding operations and a protruding out operation of the airbag 110 directed to the airbag cover 150 side. According to such a construction described above, during the time until the airbag-holding member 160 is ruptured at the tear line 164, it becomes possible to assuredly hold the folded shape of the airbag 110 in the folded condition. Furthermore, in the airbag-holding member 160 in the present embodiment, the second resin layer 161b and the second resin layer 162b each having high strength are disposed at an outside of the airbag-holding member 160, and thereby it becomes possible to secure film strength of the airbag-holding member 160 itself. Consequently, it is effective for further assuredly holding the folded shape of the airbag 110 in the folded condition after the airbag-holding member 160 is mounted as well.

Further, the airbag 110 causes the airbag cover 150 to be ruptured at the tear line 164 by weighting at a time of developing and developing operations thereof, and protrudes outside the retainer 140 through the airbag opening 144. As described above, the airbag 110 developed and expanded in a predetermined occupant restraining area is configured to restrain the motor vehicle occupant.

Next, with regard to the airbag apparatus 100 having the aforementioned construction, a method for manufacturing an airbag module product, in which the airbag 110 in the folded condition is formed into a module, will be explained referring to FIGS. 5 through 16. Incidentally, with regard to the method for manufacturing the airbag module product as the "airbag module" in the present invention, the below described first and second embodiments can at least by used.

First Embodiment

Figure 5:
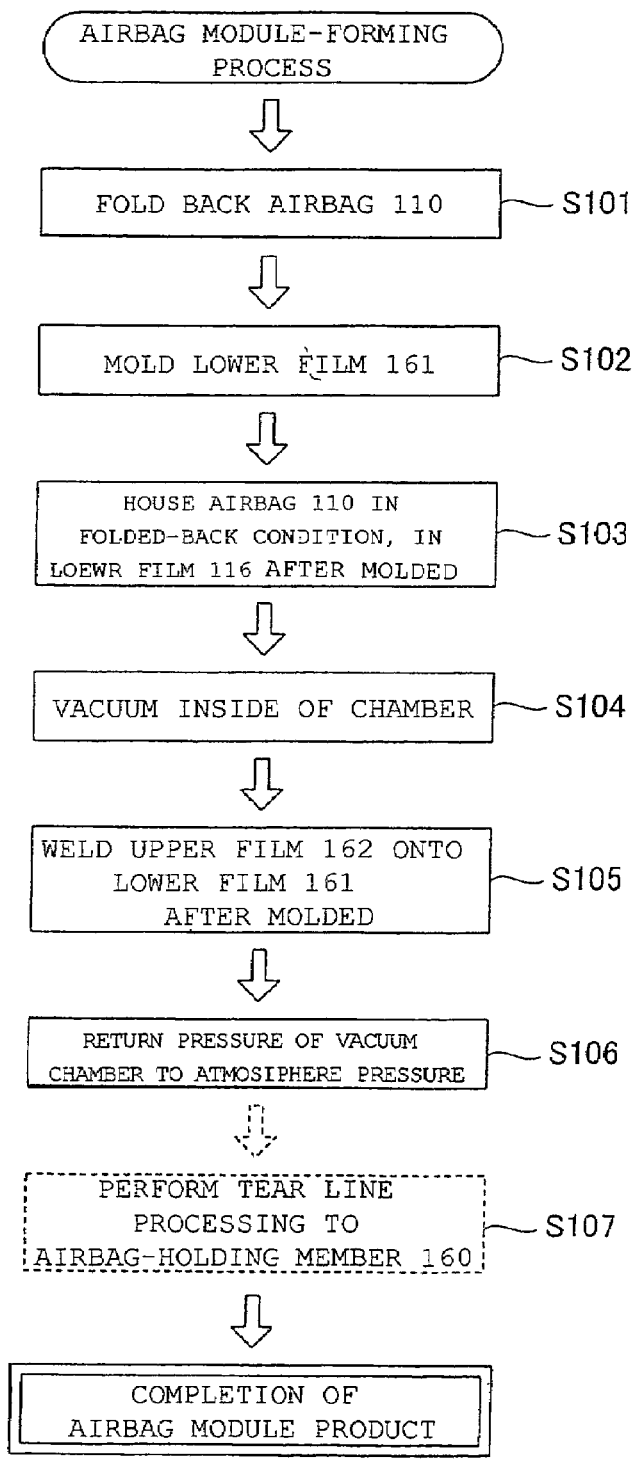
FIG. 5 is a flowchart of an airbag module-forming process in the first embodiment.

A flowchart of an airbag module-forming process in the first embodiment is shown in FIG. 5, and a condition of a process stage corresponding to FIG. 5 is shown in FIGS. 6 through 10.

As shown in FIG. 5, in the airbag module-forming process in the first embodiment, firstly, in Step S101, a process for folding back the airbag 110 in a predetermined configuration (a roll-folding configuration, a bellows folding configuration, a configuration forming the folds having no specific shape and direction in which a fold-gathering operation toward a center of an airbag are performed for an empty airbag 110 being spread, within a limit of forming cross-section of a determined height and a direction, and the like) is performed. The Step S101 in this instance corresponds to the "first step" in the present invention. Next, in Step S102 in FIG. 5, a formation for the above-described lower film sheet 161 being cut into a predetermined size is performed. Incidentally, the folding back processing for the airbag 110 in Step S101 can be performed antecedent to a processing in a subsequent stage after Step S101, as in the present embodiment, or can be performed in parallel with a processing in the subsequent stage.

Figure 6:
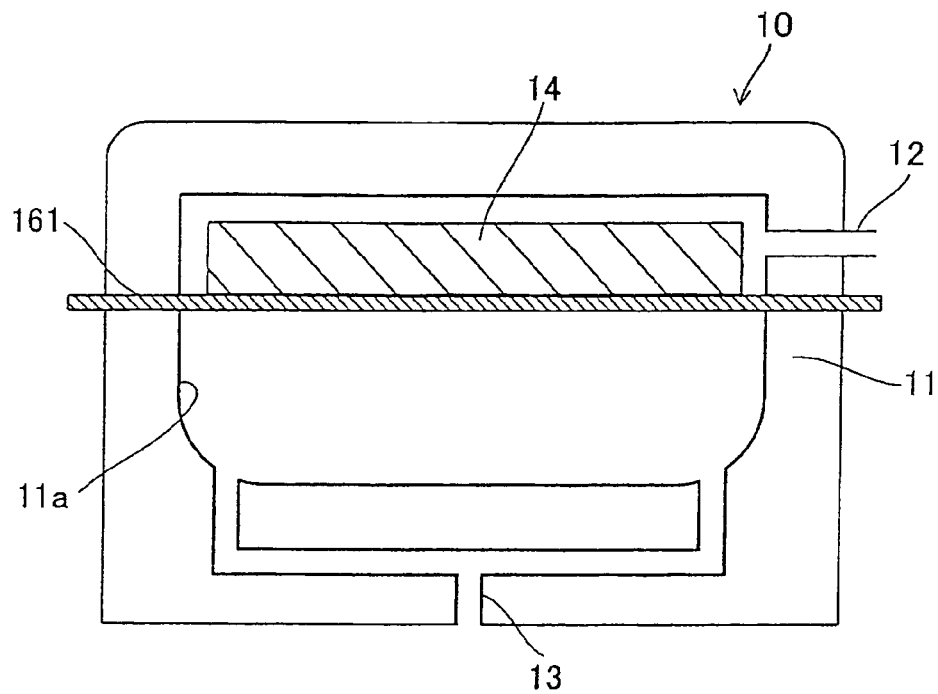
FIG. 6 is a view showing a schematic construction of a first processing device used for forming a lower film sheet in the first embodiment.
Figure 7:
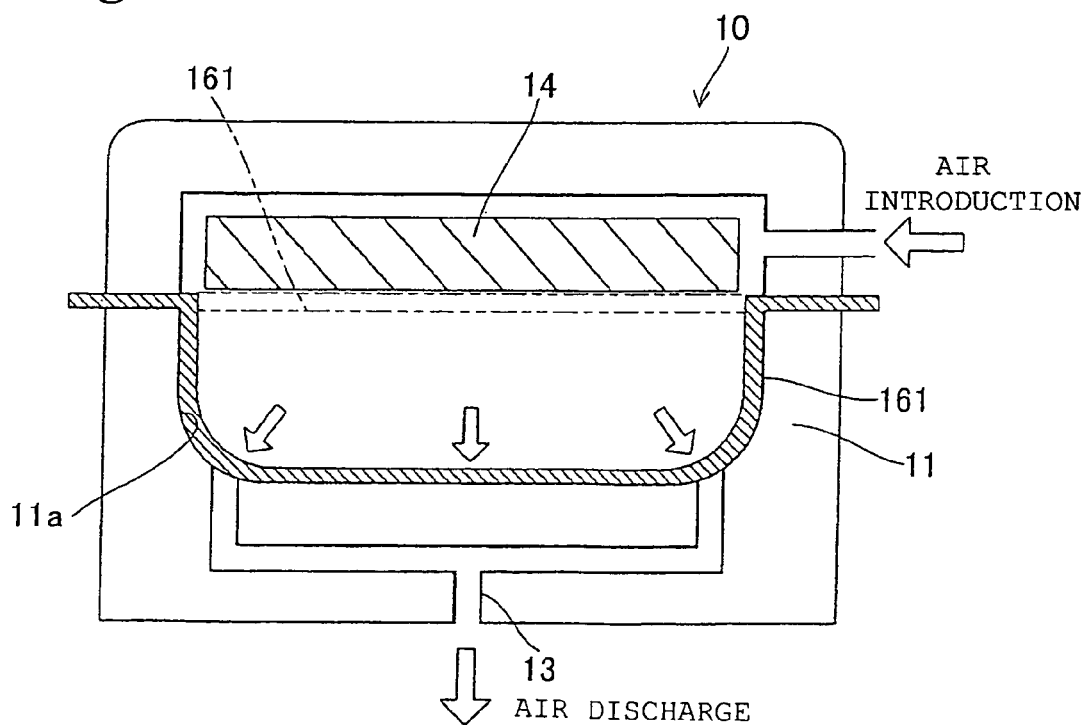
FIG. 7 is a view showing a condition of a heat-processing for the lower film sheet in the first embodiment.

At this moment, a schematic construction of a first processing device 10 used for forming the lower film sheet 161 in the first embodiment is shown in FIG. 6. As shown in FIG. 6, the first processing device 10 is constructed with a metallic mold 11 having a lower forming surface 11a, communication holes, 12 and 13, to be allowed to communicate with an internal space of the metallic mold 11, a heating device (heater) 14 disposed in the metallic mold 11, as main components. In Step S102, the lower film sheet 161 is attached to an inside of the metallic mold 11 as shown in FIG. 6, and the lower film sheet 161 is heat-processed by the heating device 14. A condition of heat-processing for the lower film sheet 161 in the first embodiment is shown in FIG. 7. As shown in FIG. 7, air in the metallic mold 11 is discharged through the communication hole 13, while introducing air into inside of the metallic mold 11 through the communication hole 12. By means of the above-described, the lower film sheet 161 having a flat plate shape (sheet-like shape) is formed along the lower forming surface 11a, and is brought to be a lower film sheet 161 formed to have a housing space, after being formed.

Figure 8:
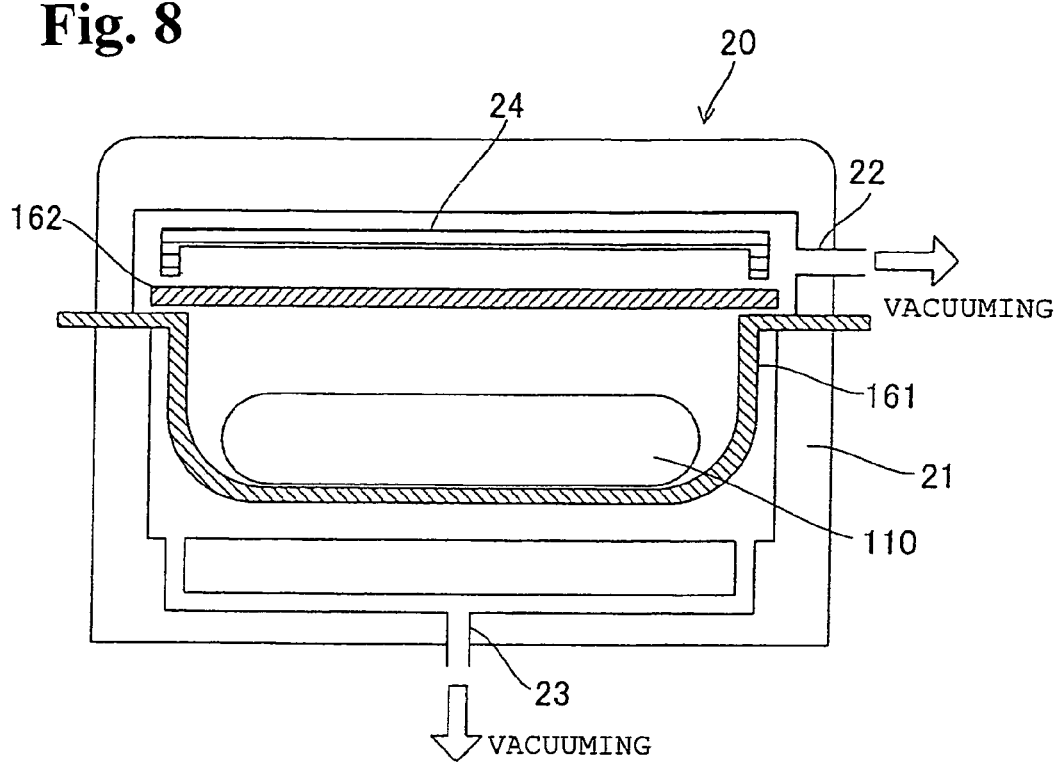
FIG. 8 is a view showing a schematic construction of a second processing device used in a vacuuming processing in the first embodiment.

Next, in Step S103 in FIG. 5, the airbag 110 in the folded condition is housed in the housing space in the lower film sheet 161 after formed in Step S102. Thereafter, an inside of a chamber of the metallic mold 11 is vacuumed in Step S104 in FIG. 5. A schematic construction of a second processing device 20 used for a vacuuming processing in the first embodiment is shown in FIG. 8. As shown in FIG. 8, the second processing device 20 is constructed with communication holes, 22 and 23, to be allowed to communicate with an inside space of a metallic mold 21, and a heat-welding device 24 disposed in an inside of the metallic mold 21, as main components. In Step S104, air is discharged (vacuuming processing) through the communication holes, 22 and 23, so as to form an inside of a chamber of the metallic mold 21 to be in a vacuum condition, in a condition for the airbag 110 in the folded condition to be housed in the housing space in the lower film sheet 161 after formed, as shown in FIG. 8. The processing for forming the inside of the chamber of the metallic mold 21 to be in the vacuum condition corresponds to the "decompression processing" in the present invention. Incidentally, in the present embodiment, the processing for forming the inside of the chamber of the metallic mold 21 to be in the vacuum condition is performed, however it is sufficient in the present invention that the decompression processing for the inside of the chamber of the metallic mold 21 is performed, and the pressure at the decompression processing can appropriately be set in a range from the atmosphere pressure to vacuum.

Figure 9:
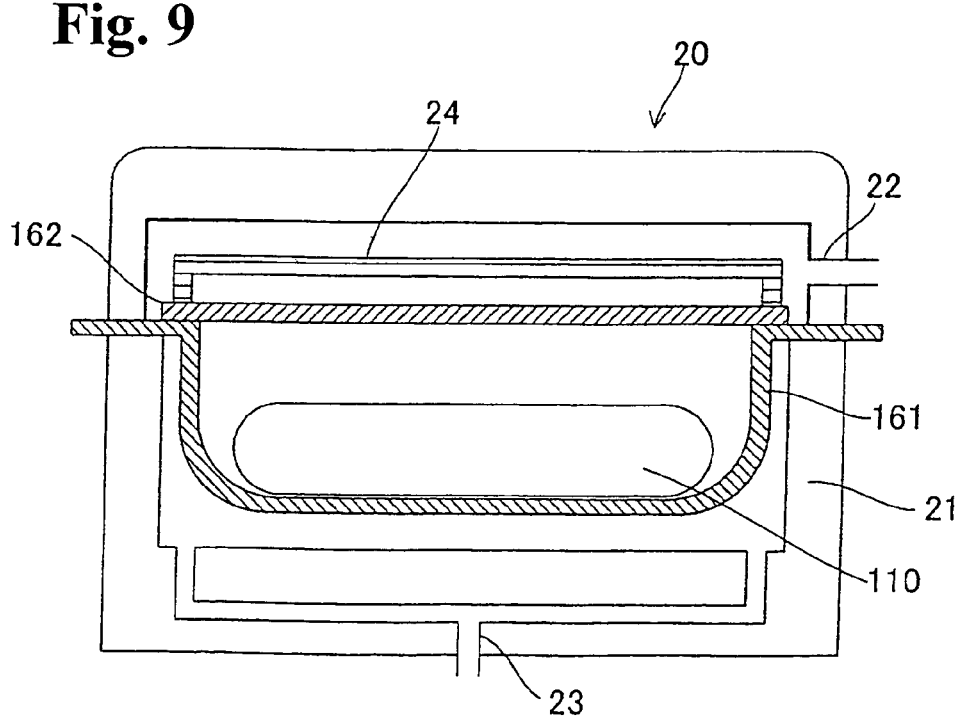
FIG. 9 is a view showing a condition in which an upper film sheet is heat-welded to the lower film sheet in the first embodiment.

Further, in Step S105 in FIG. 5, in a condition that the inside of the chamber of the metallic mold 21 is formed into the vacuum condition, the upper film sheet 162 is heat-welded onto the lower film sheet 161. A condition in which the upper film sheet 162 is heat-welded onto the lower film sheet 161 in the first embodiment is shown in FIG. 9. As shown in FIG. 9, in the heat-welding, a predetermined portion for heat-welding is heat-welded and sealed by the heat-welding device 24, in a condition in which the upper film sheet 162 is disposed above the lower film sheet 161. In concrete terms, the lower film sheet 161 and the upper film sheet 162 are caused to face each other in a manner so as for the heat-welding resin layer side thereof to inwardly be disposed, and the airbag 110 in the initially folded condition is sandwiched by the lower film sheet 161 and the upper film sheet 162. Upon performing the operations described above, each of outer edge portions of each of the film sheets is joined by the heat-welding at the heat-welding resin layer. By means of the above-described, a heat-welding portion (heat-welding portion 163 in FIG. 10) is formed between the lower film sheet 161 and the upper film sheet 162, and the entire external surface of the airbag 110 in the initially folded condition is configured to be in a tightly sealed condition by the bag-shaped airbag-holding member 160. The aforementioned Steps, S102 through S105 construct the "second step" in the present invention.

Figure 10:
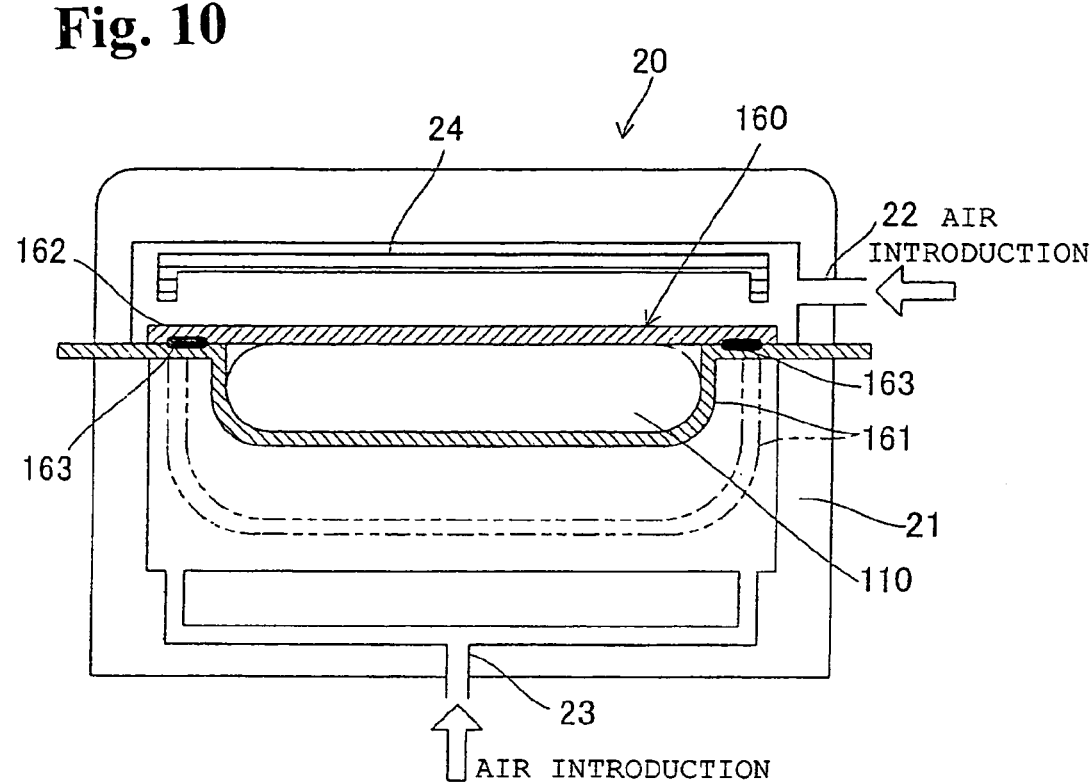
FIG. 10 is a view showing a condition of a vacuum-releasing processing in an inside of a chamber of a metallic mold in the first embodiment.

Further, in Step S106 in FIG. 5, air is introduced through the communication holes, 22 and 23, so as to return the pressure in the inside of the chamber of the metallic mold 21 to atmospheric pressure by releasing the vacuum condition thereof. A condition of a vacuum-releasing processing in the inside of the chamber of the metallic mold 21 in the first embodiment is shown in FIG. 10. As shown in FIG. 10, a condition, in which the bag-shaped airbag-holding member 160 formed from the lower film sheet 161 and the upper film sheet 162 compresses the airbag 110 in a condition of holding the airbag 110 in the folded condition, and in which the volume of the airbag 110 is reduced to be smaller compared to that at a time when the airbag 110 is initially folded, in Step S10, is to be formed. The Step S106 corresponds to the "third step" in the present invention. Further, the airbag-holding member 160 described here is a bag-shaped film forming member that compresses the initially folded airbag 110. In addition, the airbag-holding member 160 is a holding member for folding the shape of the airbag. The airbag-holding member 160 corresponds to the "film forming member" and the "airbag-holding member" in the present invention.

Incidentally, with regard to the decompression processing including the vacuuming processing, not only a method, in which the inside of the bag-shaped film forming member (airbag-holding member 160) is compressed by returning the pressure to the atmosphere pressure by releasing the evacuation after wrapping the airbag 110 in the folded condition by the bag-shaped film forming member (airbag-holding member 160) in the evacuated container, as it is performed in the present embodiment, but also a method in which the inside of the film forming member is evacuated by vacuuming out the air in an internal part of the film forming member after wrapping the airbag 110 in the folded condition by the bag-shaped film forming member, and the like can be used.

Thereafter, in Step S107 in FIG. 5, a tear line process is performed for the upper film sheet 162 of the airbag-holding member 160, and the above-described tear line 164 is provided. Thereby, the airbag module product (sometimes called as "airbag-packaging product"), in which the airbag 110 in the folded condition is held by the bag-shaped airbag-holding member 160, is manufactured. With regard to a forming method for the tear line 164, a method in which a film is weakened by performing a laser processing for the second resin layer 162b, a method in which the second resin layer 162b is weakened by heating the same with ironing, a method in which a thickness of the upper film sheet 162 itself is partially reduced, a method in which a perforation processing, a slit processing, an embossing, or the like is performed for the upper film sheet 162, or the like can appropriately be adopted.

Incidentally, in a case that the tear line process is performed for the upper film sheet 162 before the same is heat-welded to the lower film sheet 161, or in a case of a construction (a construction in which the tear line is not required) in which the airbag-holding member 160 is caused to rupture at the heat-welding portion, the Step S107 is omitted.

Incidentally, the airbag module product obtained by performing the aforementioned airbag module-forming process, shown in FIG. 5, is once examined by a worker. In concrete terms, it is confirmed whether the airbag 110 in the airbag-holding member 160 is held in a desired shape, whether the airbag 110 in the airbag-holding member 160 is nipped by the heat-welding portion 163 of the film sheets, 161 and 162, or the like, through the airbag-holding member 160 formed from a translucent resin layer. Thereby, it becomes possible for the quality of the airbag 110 to be readily ascertained. The confirmation step corresponds to the "fourth step" in the present invention.

Figure 11:
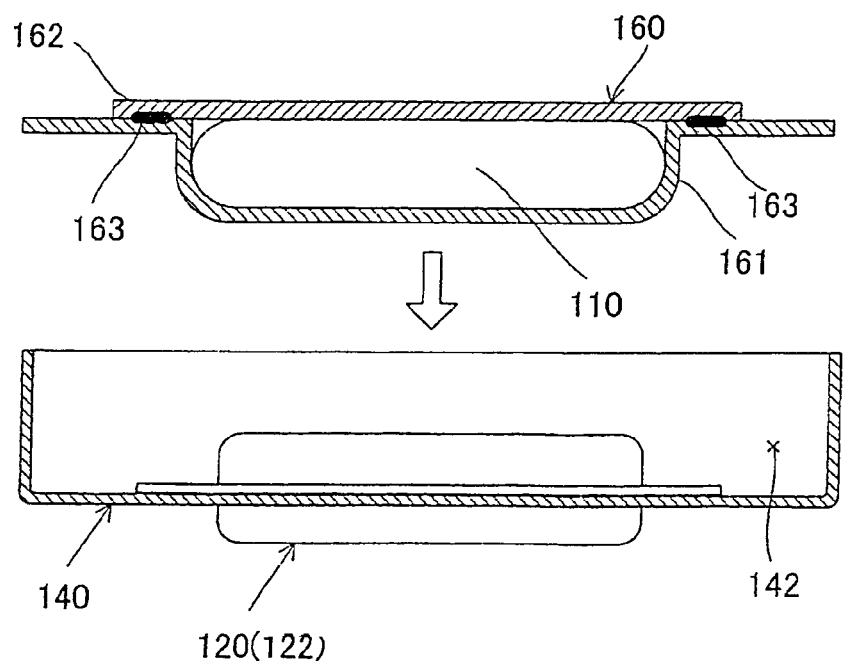
FIG. 11 is a view showing a condition in which an airbag module product in the present embodiment is housed and attached to a housing space in a retainer.

Further, the airbag module product obtained by performing the aforementioned airbag module-forming process, shown in FIG. 5, can be housed and attached to the housing space 142 of the retainer 140 in a manufacturing process of the airbag apparatus 100. A condition in which the airbag module product in the present embodiment is housed and attached to the housing space 142 of the retainer 140 is shown in FIG. 11. With regard to an attaching operation for the airbag module product, as shown in FIG. 11, a method in which the airbag module product in a condition in which the vacuuming processing is performed therefore is housed in the housing space 142 of the retainer 140 without modification may be used or other housing methods can also be used.

Figure 12:
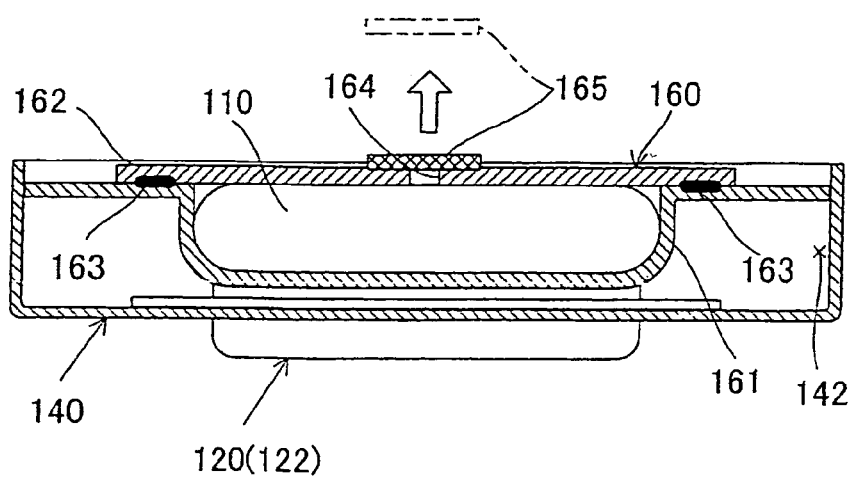
FIG. 12 is a view showing a housing method different from that shown in FIG. 11, with regard to the housing method for the airbag module product in the present embodiment.
Figure 13:
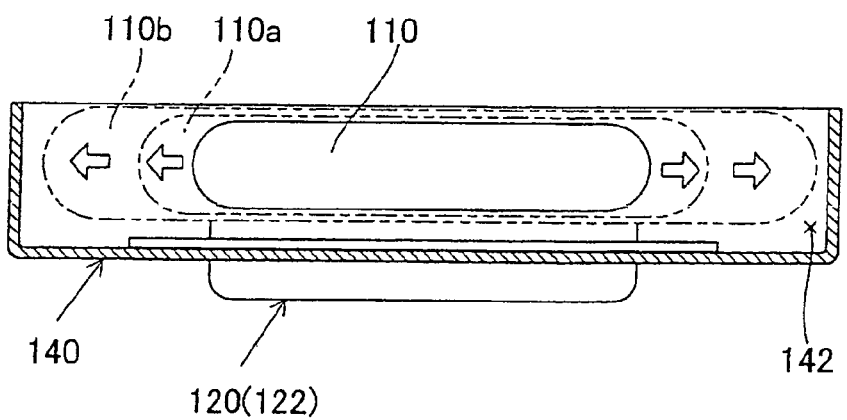
FIG. 13 is a view showing a housing method different from that shown in FIG. 11, with regard to the housing method for the airbag module product in the present embodiment.

At this moment, with regard to the housing method for the airbag module product in the present embodiment, the housing method other than that shown in FIG. 11 is shown in FIG. 12 and FIG. 13. In the housing method shown in FIG. 12 and FIG. 13, the airbag module product in a condition in which the vacuuming processing is performed therefor is housed in the housing space 142 of the retainer 140, and thereafter, the vacuuming processing condition for the airbag module product is released. In concrete terms, a tear line 164 previously constructed in a perforation like manner is provided in the upper film sheet 162. Further, a cover member 165 capable of forming both a condition in which a communication portion of the tear line 164 is obstructed, and a condition in which a covering operation is released is caused to adhere to the tear line 164. The cover member 165 is typically constructed with a pasting seal, a tape, and the like. The aforementioned process for the tear line 164 and an adhering operation for the cover member 165 can be performed before Step S104 in FIG. 5.

Further, with regard to the vacuuming processing in Step S104, as shown in FIG. 12, it is set to a condition in which the tear line 164 is obstructed by the cover member 165, and the airbag module product, in a condition in which the vacuuming processing is performed therefor, is housed in the housing space 142 of the retainer 140 (this corresponds to the "fifth step" in the present invention). Thereafter, as shown by a chain double-dashed line in FIG. 12, it is set to a condition in which the covering operation for the tear line 164 by the cover member 165 is released (this corresponds to the "sixth step" in the present invention). When the covering operation for the tear line 164 by the cover member 165 is released, since an inner part of the airbag-holding member 160 returns to the atmosphere pressure, the holding force for holding the airbag 110 exerted by the airbag-holding member 160 is weakened, and the airbag 110 is expanded along the housing space 142 of the retainer 140 by the developing force of the airbag 110 itself to release the folded condition. Thereby, even though the airbag volume occupied by the airbag 110 is increased, it becomes possible that the airbag 110 is housed in the housing space 142 of the retainer 140 in a condition of reduced airbag volume less than the volume at the time when the airbag 110 is initially folded in Step S101. In this case, the airbag 110 in the folded condition receives compression force applied from an inner wall surface o the retainer 140. The tear line 164 described here corresponds to the "communication portion" in the present invention, and the cover member 165 described here corresponds to the "cover member" in the present invention.

Furthermore, in this case, a first construction to have a condition in which the airbag-holding member 160 is kept to be housed in the housing space 142 of the retainer 140 may be used or a second construction in which the airbag-holding member 160 is removed from the housing space 142 of the retainer 140 may be used. In a case that the first construction is used, the airbag-holding member 160 still serves as a device for holding the folded shape of the airbag 110. In addition, in this case, even when the vacuuming processing for the airbag-holding member 160 is released, the holding force of the airbag-holding member 160 for holding the airbag 110 is continuously applied. Therefore, the airbag 110 is expanded by an extent of that the vacuuming processing for the airbag-holding member 160 is released, and for example, an expanded airbag 110a shown by a chain double-dashed line in FIG. 13 is to be formed. On the other hand, in a case that the second construction is used, the airbag-holding member 160 serves as a device for temporarily holding the airbag 110 until the airbag 110 is housed in the housing space 142 of the retainer 140 in a condition of the airbag 110 having reduced volume. In this case, not only the compressing force exerted by the airbag-holding member 160, but also the holding force of the airbag 110 is removed. Therefore, the airbag 110 is expanded to have a larger volume compared to that of the first construction, resulting in forming, for example, an expanded airbag 110b as shown by a chain double-dashed line in FIG. 13.

Incidentally, in a case that the present construction is applied to an airbag apparatus mounted on a portion such as a side roof rail of an automobile motor vehicle, a so called curtain airbag apparatus or the like, the airbag module product, in which the airbag 110 in the folded condition is held by the bag-shaped airbag-holding member 160, can be mounted on the mounting portion as it is without housing the same in an installing portion such as the retainer 140. In such a case, the airbag-holding member 160 is to be provided with a function for housing the airbag 110 in addition to a function for holding the folded shape of the airbag 110 in the folded condition with the reduced airbag volume compared to that in the initially folded condition. Accordingly, the airbag-holding member 160 in this case is a bag-shaped film forming member for compressing the airbag 110 in the initially folded condition, serving as a holding member for holding the shape of the airbag, and further, serving as a housing member for housing the airbag 110. The airbag-holding member 160 corresponds to the "film forming member", the "airbag-holding member", and the "airbag-housing member" in the present invention.

Second Embodiment

Figure 14:
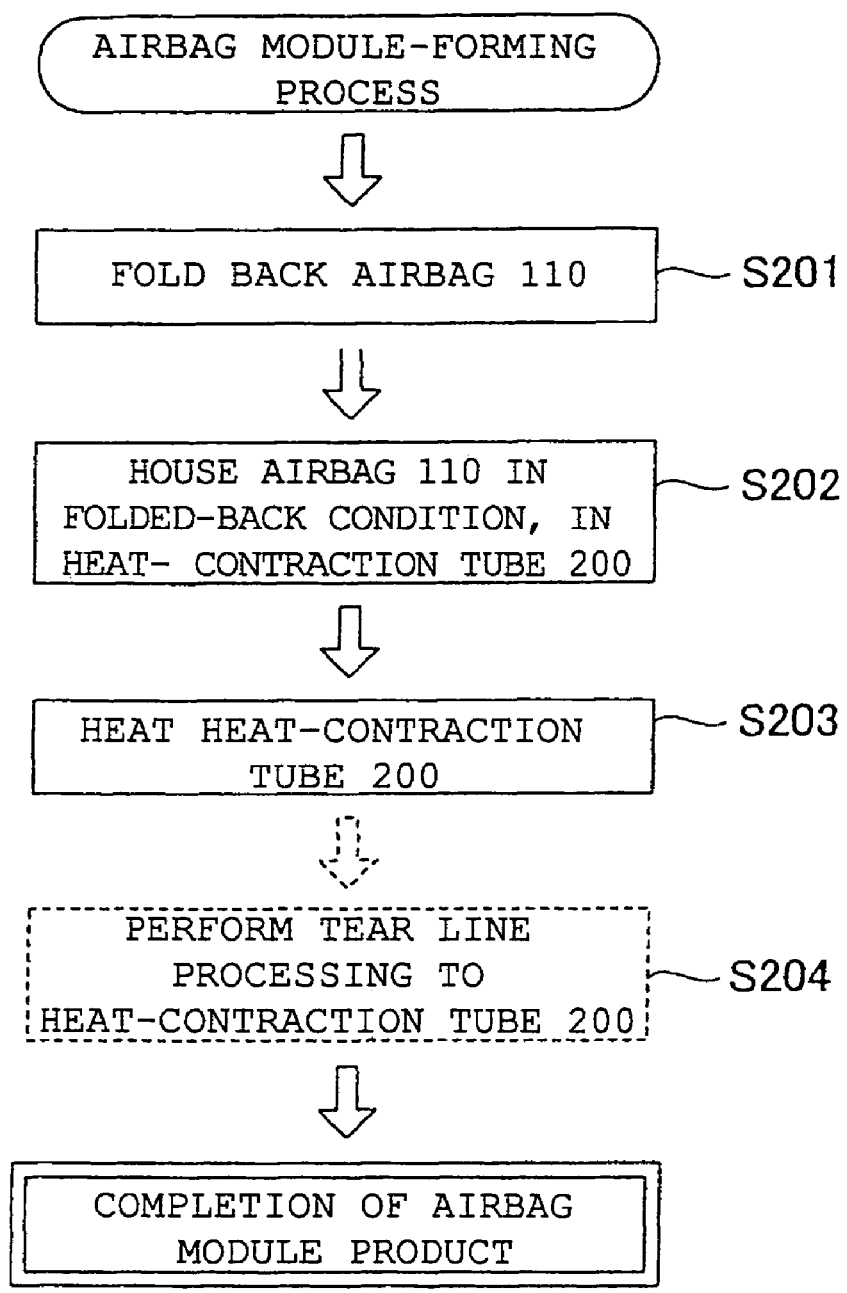
FIG. 14 is a flowchart of an airbag module-forming process in the second embodiment.
Figure 15:
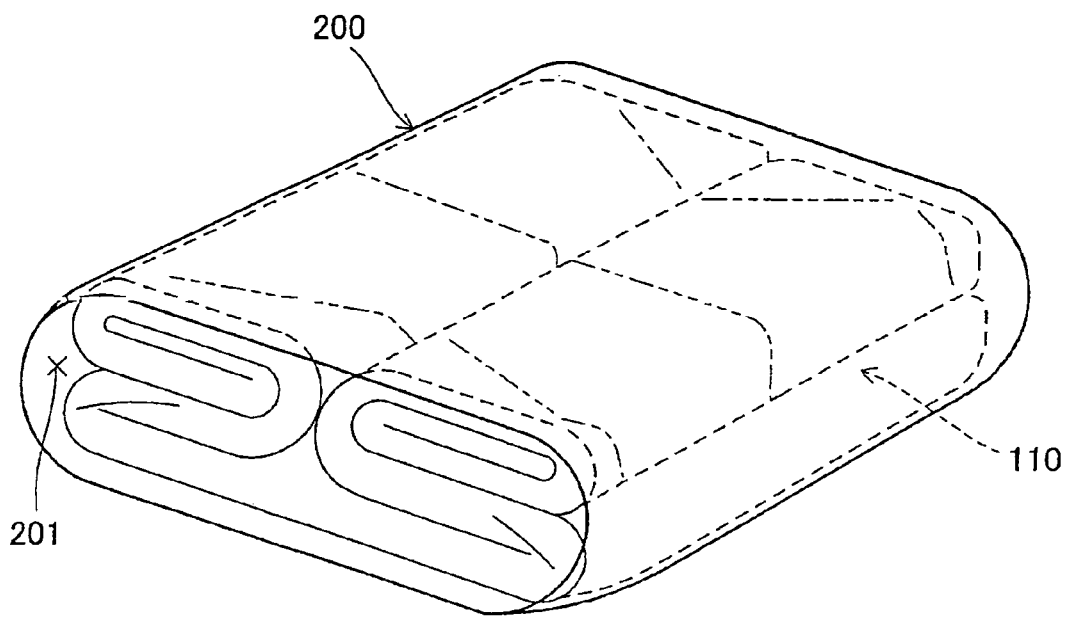
FIG. 15 is a view showing a condition of a process stage corresponding to FIG. 14.
Figure 16:
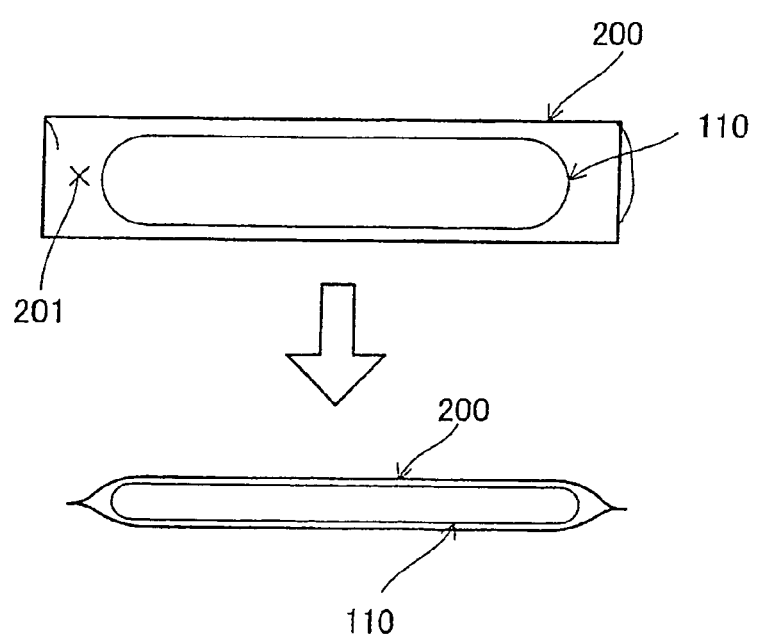
FIG. 16 is a view showing a condition of a process stage corresponding to FIG. 14.

A flowchart of an airbag module-forming process in the second embodiment is shown in FIG. 14, and a condition of a process stage corresponding to FIG. 14 is shown in FIG. 15 and FIG. 16.

As shown in FIG. 14, in the airbag module-forming process in the second embodiment, firstly in Step S201, a process for folding the airbag 110 in a predetermined configuration (a roll-folding configuration, a bellows folding configuration, a configuration forming the folds having no specific shape and direction in which a fold-gathering operation toward a center of an airbag are performed for an empty airbag 110 being spread, within a limit of forming cross-section of a determined height and a direction, and the like) is performed. The Step S201 corresponds to the "first step" in the present invention. Next, in Step S202 in FIG. 14, the airbag 110 in the folded condition is housed in a housing space 201 of a heat-contraction tube 200 being cut into a predetermined size (refer to FIG. 15). The Step S202 corresponds to the "second step" in the present invention. Incidentally, the heat-contraction tube 200 is constructed as a film forming member including a heat-contractive resin film, and typically, the film forming member having a film characteristic of a heat contraction rate from about 30 to about 60%, an allowable temperature limit from about −40 to about 100 degrees in Celsius, a moisture resistance of about 90% (in 85 degrees in Celsius) and a peel strength of about 500N or more, can be used.

Next, in Step S203 in FIG. 14, the heat-contraction tube 200 housing the airbag 110 in the folded condition is heat-processed (heated) under the condition of, for example, about 90 degrees in Celsius. The heat-processing corresponds to the "heat-contraction process" in the present invention. Thereby, as shown in FIG. 16, the airbag 110 in the folded condition, being housed in the housing space 201 is compressed by the heat-contraction tube 200 that is contracted by the heat-processing, and is provided with a reduced airbag volume less than that of the initially folded condition in Step S201. The Step S203 corresponds to the "third step" in the present invention. Further, the heat-contraction tube 200 described here is a bag-shaped film forming member that compresses the initially folded airbag 110, serving as a holding member for holding a shape of an airbag. The heat-contraction tube 200 corresponds to the "film forming member" and the "airbag-holding member" in the present invention.

Thereafter, in Step S204 in FIG. 14, the airbag module product (sometimes called as "airbag-packaging product") is to be manufactured in which the airbag in the folded condition is held by the heat-contraction tube 200 by performing the tear line process for the heat-contraction tube 200. Incidentally, in a case that the tear line process is previously performed for the heat-contraction tube 200, this Step S204 is omitted. In addition, the airbag module product obtained by means of the aforementioned airbag module-forming process shown in FIG. 14 can be housed and attached to the housing space 142 of the retainer 140 in the manufacturing process of the airbag apparatus 100.

Incidentally, in a case that the present construction is applied to the airbag apparatus mounted on the portion such as the side roof rail of the automobile motor vehicle, a so called curtain airbag apparatus or the like, the airbag module product, in which the airbag 110 in the folded condition is held by the heat-contraction tube 200, can be mounted on the mounting portion as it is without housing the same in an installing portion such as the retainer 140. In such a case, the heat-contraction tube 200 is to be provided with a function for housing the airbag 110 in addition to a function for holding the folded shape of the airbag 110 in the folded condition with the reduced airbag volume less than that in the initially folded condition. Accordingly, the heat-contraction tube 200 in this case is a bag-shaped film forming member for compressing the initially folded airbag 110, serving as a holding member for holding the shape of the airbag, and further, serving as a housing member for housing the airbag 110. The heat-contraction tube 200 corresponds to the "film forming member", the "airbag-holding member", and the "airbag-housing member" in the present invention.

As described above, the airbag module product can be miniaturized by means of an easy method, while forming the airbag 110 in the folded condition to have a reduced volume by a compression packaging operation, by performing the method described in the aforementioned first embodiment and the second embodiment, and it becomes possible to miniaturize the entire airbag apparatus 100. Thereby, flexibility of designing for the airbag apparatus and the components disposed in a peripheral area thereof is enlarged. Further, it becomes possible to be aimed at saving the space, with regard to an attaching space for the airbag apparatus to the motor vehicle.

Other Embodiment

Incidentally, the present invention is not limited to only the aforementioned embodiments, and various applications or modifications may be considered. For example, the following each embodiment, in which the aforementioned embodiment is applied, may also be carried out.

In the aforementioned embodiment, although a case that the airbag-holding member 160 is constructed using the film having the two-layer structure in which the first resin layer and the second resin layer are disposed in a layer-stack manner, is described, an airbag-holding member may be constructed using a film having a single layer structure, or a film having a multilayer structure in which another resin layer is further disposed on the film having the two-layer structure in a layer-stack manner in the present invention. In this case, as an additional resin layer, a resin layer having translucency and environmental deterioration resistance can be used. The environmental deterioration resistance described here is defined as a resin layer having good weather resistance including parameters such as, heat resistance, moisture resistance, light stability, and the like. Such a resin layer having environmental deterioration resistance described above is particularly effective in the airbag apparatus installed at a place, which is easy to be exposed to the open air environment as a motor vehicle.

Further, in the aforementioned embodiment, although the airbag apparatus mounted corresponding to the motor vehicle occupant seated in the driver's seat in the automobile is described, the present invention can also be applied to a method for manufacturing an airbag apparatus mounted corresponding to a motor vehicle occupant seated in a seat other than the driver's seat, for example, such as a motor vehicle occupant seated in a passenger seat or a rear seat, and further, to a pedestrian outside the motor vehicle. With regard to the airbag apparatus for restraining the pedestrian outside the motor vehicle, typically, the airbag apparatus can be mounted on a motor vehicle bonnet portion, a cowl portion, an A-pillar portion, and the like.

Furthermore, in the aforementioned embodiment, although the airbag apparatus mounted on the automobile motor vehicle is described, the present invention can also be applied to a construction of an airbag apparatus in a motor vehicle other than the automobile, such as for example, a truck, a bus, an electric train, boats and ships, a motor cycle, and the like.

The disclosure of Japanese Patent Application No. 2005-379263 filed on Dec. 28, 2005 on which the claim for priority for the instant application is based is hereby incorporated by reference thereto.

While the invention has been explained with reference to the specific embodiments of the invention, the explanation is illustrative and the invention is limited only by the appended claims.

What is claimed is:

1. A method for manufacturing an airbag module for use in a motor vehicle, comprising:
  folding an airbag into an initially folded condition;
  disposing the airbag in the initially folded condition within a mold;
  wrapping an entire external surface of the airbag in the initially folded condition using a film, wherein the film comprises a plurality of resin layers formed in a layer-stack manner with regard to a film cross-sectional direction;

evacuating the mold;

joining portions of the film to form a sealed bag which encloses the airbag; and introducing air into an interior of the mold so that the airbag is compressed to an airbag volume less than the initially folded condition, by a compression force applied to the film.

2. The method for manufacturing the airbag module according to claim 1, wherein the film comprises a heat-contractive resin layer, and in the step of introducing air, the airbag in the initially folded condition is compressed via the film by performing a heat-contraction process on the film thereby reducing the airbag volume to a volume less than that at the time of being initially folded.

3. The method for manufacturing the airbag module according to claim 2, wherein the film for compressing the initially folded airbag is used as an airbag-housing member.

4. The method for manufacturing the airbag module according to claim 2, wherein the film for compressing the initially folded airbag is used as an airbag-holding member for holding a folded shape of the airbag.

5. The method for manufacturing the airbag module according to claim 1, wherein the film comprises two sheets of the film including a heat-welding resin layer; and wherein in the wrapping step, two sheets of the film are arranged such that the heat-welding resin layers are disposed to face one other, and the airbag, in the initially folded condition, is sandwiched between the two sheets.

6. The method for manufacturing the airbag module according to claim 5, wherein after sandwiching the airbag in the initially folded condition by the two sheets of the film, outer edge portions of the two sheets are joined to each other and formed into the bag in a tightly sealed condition by heat-welding the heat-welding resin layer.

7. The method for manufacturing the airbag module according to claim 5, wherein any of the plurality of resin layers of the film comprises a translucent resin layer, and wherein the method further comprises a step of confirming a condition of the airbag during the step of disposing the initially folded airbag in the mold, via observation of the airbag through the film.

8. The method for manufacturing the airbag module according to claim 1, wherein the film used for compressing the airbag in the initially folded condition is used as an airbag-housing member.

9. The method for manufacturing the airbag module according to claim 1, wherein the film for compressing the airbag in the initially folded condition, is used as an airbag-holding member for maintaining a folded shape of the airbag.

10. The method for manufacturing the airbag module according to claim 1, further comprising:

a step of housing the film in an airbag-housing member having a housing space larger than the film and smaller than the airbag in the initially folded condition; and a step of expanding the airbag within the housing space while weakening the compression force applied to the airbag by weakening a vacuum in the bag.

11. The method for manufacturing the airbag module according to claim 1, further comprising the step of allowing air into the bag to attenuate vacuum therein.

12. The method for manufacturing the airbag module according to claim 11, further comprising the step of disposing the airbag enclosed in the bag, into a retainer before the step of allowing air into the bag and permitting the bag to expand.

13. The method for manufacturing the airbag module according to claim 1, wherein the mold has a lower forming surface, and communication holes which communicate with an internal space of the mold and via which vacuum and air can be selectively supplied into the internal space of the mold.

14. The method for manufacturing the airbag module according to claim 13, wherein the mold further includes a heater.

15. The method for manufacturing the airbag module according to claim 13, wherein the mold further includes a heat welder.

16. The method for manufacturing the airbag module according to claim 1, wherein the step of wrapping comprises:

disposing a first film sheet in the mold;

heating the film sheet and evacuating part of the mold to cause the heated film sheet to assume a shape of a portion of the mold;

disposing the airbag in the initially folded condition, on the first film sheet;

disposing a second film sheet in the mold in manner to contact the first film sheet and to enclose the airbag, thus wrapping the airbag in the film; and wherein the step of joining comprises:

joining, while exposed to vacuum within the mold, the first and second film sheets to form the sealed bag.

17. A method for manufacturing an airbag module for use in a motor vehicle, comprising:

a first step of folding an airbag into a predetermined configuration;

a second step of wrapping an entire external surface of the airbag in an initially folded condition obtained in the first step by a bag-shaped film forming member, wherein the bag-shaped film forming member comprises a plurality of resin layers formed in a layer-stack manner with regard to a film cross-sectional direction; and a third step of housing the initially folded airbag in an airbag-housing member in a condition wherein the airbag has an airbag volume reduced to less than that at a time of being initially folded, by a compression force applied to the bag-shaped film forming member, wherein the bag-shaped film forming member comprises a film sheet including a heat-welding resin layer; and in the second step, two pieces of film sheets are arranged such that the heat-welding resin layers are disposed to face one other, and the initially folded airbag is sandwiched between the film sheets, wherein in the second step after sandwiching the initially folded airbag, each of outer edge portions of the film sheets is joined and formed into a bag shape in a tightly sealed condition by heat-welding the heat-welding resin layer, wherein in the third step, the initially folded airbag is compressed via the film forming member by performing an evacuation process on the bagshaped film forming member in a tightly sealed condition so that the airbag volume is reduced less than that at the time being initially folded, wherein any of the plurality of resin layers of the film forming member comprises a translucent resin layer, and the method further comprises a fourth step of confirming a condition of the airbag obtained in the third step via observation of the airbag through the bag-shaped film forming member, a fifth step of housing the film forming member in an airbag-housing member having a housing space larger than the film forming member and smaller than the initially folded airbag, and a sixth step of expanding the airbag along the housing space of the airbag-housing member while weakening the compression force applied to the airbag by weakening an evacuation performed in the third step, wherein the film forming member comprises a communication portion for allowing an inside and an outside of the film forming member to communicate with each other, and a cover member capable of forming a covering condition of covering the communication portion and a releasing condition for releasing a covering operation, and wherein the communication portion is set in a condition covered by the cover member when the evacuation processing for the film forming member is performed in the third step while the communication portion is set to a releasing condition by the cover member when a decompression processing for the film forming member is weakened in the sixth step.

* * * * *